United States Patent
Kondo et al.

(10) Patent No.: US 10,094,008 B2
(45) Date of Patent: Oct. 9, 2018

(54) SEAMLESS STEEL PIPE FOR LINE PIPE USED IN SOUR ENVIRONMENTS

(71) Applicant: NIPPON STEEL & SUMITOMO METAL CORPORATION, Tokyo (JP)

(72) Inventors: Keiichi Kondo, Wakayama (JP); Yuji Arai, Amagasaki (JP); Kenji Kobayashi, Nishinomiya (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 322 days.

(21) Appl. No.: 14/901,746

(22) PCT Filed: Jun. 23, 2014

(86) PCT No.: PCT/JP2014/003345
§ 371 (c)(1),
(2) Date: Dec. 29, 2015

(87) PCT Pub. No.: WO2015/001759
PCT Pub. Date: Jan. 8, 2015

(65) Prior Publication Data
US 2016/0369381 A1    Dec. 22, 2016

(30) Foreign Application Priority Data

Jul. 4, 2013 (JP) .................. 2013-140404

(51) Int. Cl.
*C22C 38/28* (2006.01)
*C21D 9/08* (2006.01)
(Continued)

(52) U.S. Cl.
CPC .............. *C22C 38/28* (2013.01); *C21D 8/105* (2013.01); *C21D 9/08* (2013.01); *C22C 38/00* (2013.01);
(Continued)

(58) Field of Classification Search
CPC ................................................. C21D 2211/005
See application file for complete search history.

(56) References Cited

U.S. PATENT DOCUMENTS

2005/0167013 A1* 8/2005 Murao ..................... C21D 8/10
148/593

FOREIGN PATENT DOCUMENTS

| CN | 101542001 | 9/2009 |
| CN | 102666885 | 9/2012 |

(Continued)

*Primary Examiner* — Jessee R Roe
*Assistant Examiner* — Jophy S Koshy
(74) *Attorney, Agent, or Firm* — Clark & Brody

(57) ABSTRACT

A seamless steel pipe has a yield strength of 400 MPa or less and excellent HIC resistance. The seamless steel pipe includes: a chemical composition consisting, in mass %, of, C: 0.01 to 0.20%, Si: 0.05 to 0.50%, Mn: 0.3 to 2.0%, P: 0.02% or less, S: 0.01% or less, Cr: 0.02 to 0.2%, sol.Al: 0.001 to 0.100%, O: 0.0050% or less, N: 0.0100% or less, Ca: 0 to 0.0050%, Ti: 0 to 0.012%, and Nb: 0 to 0.012%, the balance being Fe and impurities; and a structure consisting, in area ratio, of 10 to 50% of ferrite and 0 to less than 5% of pearlite, the balance being tempered bainite and/or tempered martensite, and the number of inclusions each having a grain diameter of 50 mm or more is not more than 15 per 100 mm², and the seamless steel pipe has a yield strength of 400 MPa or less.

4 Claims, 1 Drawing Sheet

(51) Int. Cl.
*C22C 38/00* (2006.01)
*C22C 38/38* (2006.01)
*C22C 38/04* (2006.01)
*C21D 8/10* (2006.01)
*C22C 38/02* (2006.01)
*C22C 38/06* (2006.01)
*C22C 38/26* (2006.01)
*F16L 9/02* (2006.01)

(52) U.S. Cl.
CPC .......... *C22C 38/001* (2013.01); *C22C 38/002* (2013.01); *C22C 38/02* (2013.01); *C22C 38/04* (2013.01); *C22C 38/06* (2013.01); *C22C 38/26* (2013.01); *C22C 38/38* (2013.01); *F16L 9/02* (2013.01); *C21D 2211/002* (2013.01); *C21D 2211/004* (2013.01); *C21D 2211/005* (2013.01); *C21D 2211/008* (2013.01); *C21D 2211/009* (2013.01)

(56) References Cited

FOREIGN PATENT DOCUMENTS

| | | |
|---|---|---|
| CN | 102699628 | 10/2012 |
| CN | 102906292 | 1/2013 |
| JP | 52-111815 | 9/1977 |
| JP | 54-110119 | 8/1979 |
| JP | 58-18967 | 4/1983 |
| JP | 61-60866 | 3/1986 |
| JP | 2004-143593 | 5/2004 |
| JP | 2004-176172 | 6/2004 |

\* cited by examiner

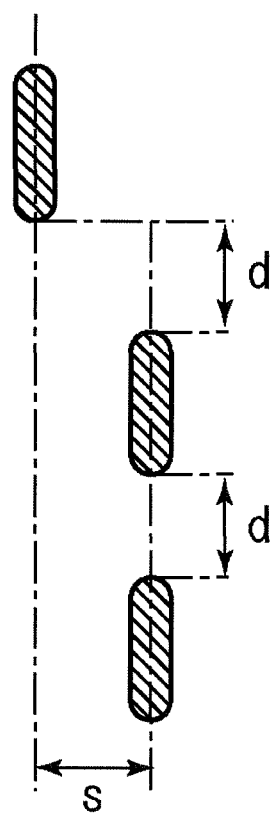

SEAMLESS STEEL PIPE FOR LINE PIPE USED IN SOUR ENVIRONMENTS

TECHNICAL FIELD

The present invention relates to a seamless steel pipe. More particularly, it relates to a seamless steel pipe for a line pipe that is used in sour environments containing hydrogen sulfide ($H_2S$), which is a corrosive gas.

BACKGROUND ART

Crude oil and natural gas contain wet hydrogen sulfide. Such an environment is called a sour environment. Line pipes transport crude oil or natural gas produced from oil wells or gas wells. Therefore, the line pipes are used in sour environments. Line pipes used in such sour environments have a problem of hydrogen embrittlement attributable to hydrogen sulfide.

The hydrogen embrittlement includes sulfide stress cracking and hydrogen-induced cracking (hereinafter referred to as HIC). Sulfide stress cracking occurs in a steel product under static external stress. HIC occurs in a steel product with no external stress thereon. Line pipes are less subject to static external stress compared to oil well pipes. Thus, line pipes are especially required to have HIC resistance.

It is known that, in general, HIC occurs easily with an increase in steel strength.

Techniques for enhancing the HIC resistance of a steel product for a line pipe are proposed in Japanese Patent Application Publication No. 54-110119 (Patent Document 1), Japanese Patent Publication No. 58-18967 (Patent Document 2), Japanese Patent Application Publication No. 52-111815 (Patent Document 3), Japanese Patent Application Publication No. 61-60866 (Patent Document 4), Japanese Patent Application Publication No. 2004-176172 (Patent Document 5) and Japanese Patent Application Publication No. 2004-143593 (Patent Document 6).

The steel for a line pipe disclosed in Patent Document 1 contains Ca and Ce, and MnS in the steel is spheroidized. Patent Document 1 describes that the HIC resistance of the steel for a line pipe is thereby enhanced.

The steel for a line pipe disclosed in Patent Document 2 has a chemical composition containing Cu and Ni as essential elements and further satisfying Ca/S≤2.0. Patent Document 2 describes that the HIC resistance of the steel for a line pipe is thereby enhanced.

The steel product for a line pipe disclosed in Patent Document 3 has the reduced contents of elements that are easily segregated such as Mn, P and S and further contains alloying elements such as Cu, Ni, Cr and Mo. Patent Document 3 describes that entrance of hydrogen to the steel is thereby suppressed, enhancing the HIC resistance of the steel product for a line pipe.

The steel product for a line pipe disclosed in Patent Document 4 contains Ni, Cr and/or Mo. Patent Document 4 describes that entrance of hydrogen to the steel is thereby suppressed, enhancing the HIC resistance of the steel product for a line pipe.

The steels disclosed in Patent Documents 5 and 6 contain Mo and V as essential elements, and ferrite is precipitated on the grain boundaries of the quenched structures of bainite and martensite, suppressing crystal grain boundary embrittlement. Patent Documents 5 and 6 describe that a yield strength of 483 MPa or more and excellent HIC resistance can thereby be attained.

PRIOR ARTS DOCUMENTS

Patent Documents

Patent Document 1: Japanese Patent Application Publication No. 54-110119
Patent Document 2: Japanese Patent Publication No. 58-18967
Patent Document 3: Japanese Patent Application Publication No. 52-111815
Patent Document 4: Japanese Patent Application Publication No. 61-60866
Patent Document 5: Japanese Patent Application Publication No. 2004-176172
Patent Document 6: Japanese Patent Application Publication No. 2004-143593

Conventionally, as stated above, it has been thought that if the strength is low, HIC is less liable to occur. However, as a result of researches conducted by the present inventors, it was found, as a new finding, that not only in the case where the strength is high but also in the case where the strength is low, that is, the yield strength is 400 MPa or less, HIC may occur. Hereinafter, in the present specification, "low strength" refers to a yield strength of 400 MPa or less and "high strength" refers to a yield strength of more than 400 MPa.

Therefore, it is desirable to suppress occurrence of HIC in a low-strength seamless steel pipe.

SUMMARY OF INVENTION

An objective of the present invention is to provide a seamless steel pipe that is used for a line pipe used in sour environments, the seamless steel pipe having a yield strength of 400 MPa or less and excellent HIC resistance.

The seamless steel pipe according to the present embodiment is used for a line pipe used in sour environments. The seamless steel pipe includes: a chemical composition consisting, in mass %, of, C: 0.01 to 0.20%, Si: 0.05 to 0.50%, Mn: 0.3 to 2.0%, P: 0.02% or less, S: 0.01% or less, Cr: 0.02 to 0.2%, sol.Al: 0.001 to 0.100%, O: 0.0050% or less, N: 0.0100% or less, Ca: 0 to 0.0050%, Ti: 0 to 0.012%, and Nb: 0 to 0.012%, the balance being Fe and impurities; and a structure consisting, in area ratio, of 10 to 50% of ferrite and 0 to less than 5% of pearlite, the balance being tempered bainite and/or tempered martensite, and the number of inclusions each having a grain diameter of 50 μm or more is not more than 15 per 100 $mm^2$, and the seamless steel pipe has a yield strength of 400 MPa or less.

The chemical composition of the seamless steel pipe according to the present embodiment may contain Ca: 0.0005 to 0.0050%. The chemical composition of the seamless steel pipe according to the present embodiment may contain one or more selected from a group consisting of Ti: 0.002 to 0.012% and Nb: 0.002 to 0.012%.

The seamless steel pipe of the present embodiment exhibits excellent HIC resistance even though it has a low strength of 400 MPa or less.

BRIEF DESCRIPTION OF DRAWINGS

FIG. 1 is a schematic diagram illustrating clustered inclusions.

DESCRIPTION OF EMBODIMENTS

An embodiment of the present invention will be described in detail below.

The present inventors researched and studied occurrence of HIC in low-strength seamless steel pipes and obtained the following findings.

(1) HIC occurs through the mechanism described below. Hydrogen accumulates around coarse inclusions in steel, and forms the starting point of HIC. If the steel yields on account of the rise in hydrogen pressure at the starting point, a crack is produced. The dislocation and hydrogen further accumulate at the edges of the crack. Consequently, HIC occurs.

In low-strength seamless steel pipes, particularly, blisters, which are a type of HIC, are liable to occur. A blister is a crack (a bulge) that occurs in the vicinity of a surface of a steel product and extends in the axial direction of the steel product. Even if a crack area ratio CAR obtained by a CAR test, which will be described later, is 0%, a blister may exist. In conventional seamless steel pipes having a high strength (strength of more than 400 MPa), occurrence of a blister does not result in, e.g., leakage of a transmitted fluid because of the high strength. Thus, the blisters cause no particular problems.

However, in low-strength seamless steel pipes, a plurality of blisters arranged in the wall thickness direction may be combined to produce a large crack (HIC). Therefore, occurrence of blisters is also preferably suppressed in low-strength seamless steel pipes.

In general, a low-strength seamless steel pipe is produced by being allowed to cool as it is after pipe manufacturing. In this case, the structure of the seamless steel pipe is a structure of two phases, ferrite and pearlite. Since the ratio of ferrite having low yield strength is large, HIC is liable to occur because of yield of ferrite.

Therefore, for the seamless steel pipe according to the present embodiment, quenching and tempering are performed despite the low strength. Consequently, the area ratio of ferrite in the steel (hereinafter referred to as ferrite ratio) becomes 50% or less. Then, instead of ferrite, tempered bainite and/or tempered martensite are formed. Since bainite and martensite each have a strength higher than that of ferrite, yield due to hydrogen pressure is suppressed. Thus, occurrence of HIC (which includes blisters) is suppressed.

(2) In the present embodiment, furthermore, the area ratio of pearlite in the structure (hereinafter referred to as pearlite ratio) is set to less than 5%. If the pearlite ratio is high, HIC is liable to occur. As a reason for that, the following can be considered. Hydrogen ions resulting from a corrosion reaction are absorbed to a surface of the steel product and enter the inside of the steel as atomic hydrogen. The hydrogen that has entered the inside of the steel diffuses and accumulates around carbide included in the pearlitic phase. Internal cracking occurs due to the inner pressure of the hydrogen accumulated around the carbide. Thus, the HIC resistance of steel locally having the pearlitic phase is low. A decrease in pearlite ratio enhances the hydrogen embrittlement resistance. In particular, if the pearlite ratio is less than 5%, excellent HIC resistance can be achieved despite the low strength.

(3) As stated above, HIC easily occurs with inclusions as the starting point. Accordingly, the number of coarse inclusions in steel is preferably as small as possible. In the case of the chemical composition of the present embodiment, if the number of inclusions each having a grain diameter of 50 μm or more (hereinafter referred to as coarse inclusions) (coarse inclusion count) N is not more than 15 per 100 mm$^2$, occurrence of HIC (including blisters) is suppressed.

Based on the above findings, the seamless steel pipe of the present embodiment has been completed. The seamless steel pipe of the present embodiment will be described in detail below.

[Chemical Composition]

The seamless steel pipe according to the present embodiment has the following chemical composition.

C: 0.01 to 0.20%

Carbon (C) enhances the hardenability, and enhances the strength of steel. If the C content is too low, the above effects cannot be achieved. On the other hand, the seamless steel pipe of the present embodiment is connected to another seamless steel pipe by a circumferential welding, as a line pipe. Therefore, if the C content is too high, the heat affected zone (HAZ) of the circumferential welding hardens, and the SSC resistance decreases. Furthermore, if the C content is too high, the toughness of the weld zone of a steel product for a line pipe decreases. Therefore, the C content is 0.01 to 0.20%. The lower limit of the C content is preferably more than 0.01%, further preferably 0.03%, still further preferably 0.05%. The upper limit of the C content is preferably less than 0.20%, further preferably 0.15%.

Si: 0.05 to 0.50%

Silicon (Si) deoxidizes a steel. If the Si content is too low, this effect cannot be achieved. On the other hand, if the Si content is too high, the toughness of the welding heat affected zone decreases. If the Si content is too high, furthermore, excessive ferrite is produced. Thus, the HIC resistance decreases. Therefore, the Si content is 0.05 to 0.50%. The lower limit of the Si content is preferably more than 0.05%, further preferably 0.10%, still further preferably 0.16%. The upper limit of the Si content is preferably less than 0.50%, further preferably 0.30%.

Mn: 0.3 to 2.0%

Manganese (Mn) enhances the hardenability of steel, and enhances the strength of steel. Furthermore, Mn enhances the toughness of steel. If the Mn content is too low, these effects cannot be achieved. On the other hand, if the Mn content is too high, HIC is liable to occur due to the hardening of steel caused by Mn segregation and due to the formation of MnS. Therefore, the Mn content is 0.3 to 2.0%. The lower limit of the Mn content is preferably more than 0.3%, further preferably 0.5%. The upper limit of the Mn content is preferably less than 2.0%, further preferably 1.6%.

P: 0.02% or Less

Phosphorus (P) is an impurity. Phosphorus segregates and thereby forms a hardened structure in steel. In the case of a seamless steel pipe, a hardened structure is easily formed in the vicinity of the internal surface of the steel pipe and HIC is liable to occur. Thus, the P content is preferably as low as possible. Therefore, the P content is 0.02% or less. The P content is preferably less than 0.02%.

S: 0.01% or Less

Sulfur (S) is an impurity. Sulfur forms MnS. The MnS serves as the starting point of HIC. Therefore, the S content is preferably as low as possible. However, the decreasing of the S content incurs high costs. For the seamless steel pipe of the present embodiment, in order to reduce the production cost, the S content should be 0.01% or less. For the seamless steel pipe of the present embodiment, even where more than 0.003% of S is contained, excellent HIC resistance is exhibited if the seamless steel pipe includes the later-described structure.

Cr: 0.02 to 0.2%

Chromium (Cr) enhances the hardenability of steel and reinforces the steel. If the Cr content is too low, this effect cannot be achieved. On the other hand, if the Cr content is too high, excessive ferrite is produced and the HIC resistance decreases. Furthermore, if the Cr content is too high, a hardened structure may be formed locally in the steel or uneven corrosion may be caused in the surface of the steel. Therefore, the Cr content is 0.02 to 0.2%. The lower limit of the Cr content is preferably more than 0.02%, further preferably 0.05%. The upper limit of the Cr content is preferably less than 0.2%.

sol.Al: 0.001 to 0.100%

Aluminum (Al) deoxidizes a steel. If the Al content is too low, insufficient oxidation occurs, whereby, e.g., a surface defect is formed in the billet, resulting in deterioration in hardness. On the other hand, if the Al content is too high, e.g., cracking occurs in the cast piece. Therefore, the Al content is 0.001 to 0.100%. The lower limit of the Al content is preferably more than 0.001%. The upper limit of the Al content is preferably less than 0.100%, further preferably 0.07%. In the present description, the Al content means the content of acid-soluble Al (sol.Al).

O: 0.0050% or Less

Oxygen (O) is an impurity. Oxygen forms coarse oxides or a cluster of oxides, and decreases the toughness and HIC resistance of steel. Thus, the O content is preferably as low as possible. Therefore, the O content is 0.0050% or less. The O content is preferably 0.0030% or less.

N: 0.0100% or Less

Nitrogen (N) is an impurity. Nitrogen forms coarse nitrides, and decreases the toughness and SSC resistance of steel. Thus, the N content is preferably as low as possible. Therefore, the N content is 0.0100% or less. The N content is preferably 0.006% or less.

The balance of chemical composition of the seamless steel pipe of the present embodiment is Fe and impurities. The impurities referred to herein are elements that are mixed in from ore and scrap used as steel raw materials or from the environment in the production process or the like. In the present embodiment, Mo, V, Cu and Ni are impurities. Even if none of these alloying elements is used, the seamless steel pipe of the present embodiment exhibits excellent HIC resistance.

[Concerning Optional Elements]

Furthermore, the seamless steel pipe of the present embodiment may contain Ca.

Ca: 0 to 0.0050%

Calcium (Ca) is an optional element. Calcium suppresses the clogging of a tundish nozzle when casting is performed. Furthermore, Ca controls the form of MnS and enhances the corrosion resistance of steel. If the Ca content is too low, these effects cannot be achieved. On the other hand, if the Ca content is too high, inclusions form a cluster, and the toughness and HIC resistance of the steel are decreased. Therefore, the Ca content is 0 to 0.0050%. The lower limit of the Ca content is preferably 0.0005%. The upper limit of the Ca content is preferably less than 0.0050%.

Furthermore, the seamless steel pipe of the present embodiment may contain one or more types of elements selected from a group consisting of Ti and Nb. Any of these elements performs grain refinement of steel.

Ti: 0 to 0.012%

Titanium (Ti) is an optional element. Like Nb, Titanium combines with C and N to form carbo-nitride, and performs grain refinement of steel due to the pinning effect. The grain refinement increases grain boundaries, whereby propagation of HIC cracks such as blisters is inhibited by the grain boundaries. Thus, the HIC resistance is enhanced. However, if the Ti content is too high, TiN coarsens. In this case, coarse TiN serves as the starting point of HIC, and the HIC resistance decreases. Therefore, the Ti content is 0 to 0.012%. The lower limit of the Ti content is preferably 0.002%, further preferably 0.005%. The upper limit of the Ti content is preferably less than 0.010%.

Nb: 0 to 0.012%

Niobium (Nb) dissolves ferrite and enhances the strength of steel. Furthermore, Nb combines with C and N to form carbo-nitride, and performs grain refinement of steel due to the pinning effect. On the other hand, if the Nb content is too high, coarse carbo-nitride is formed. The coarse carbo-nitride serves as the starting point of HIC. Therefore, the Nb content is 0 to 0.012%. The lower limit of the Nb content is preferably 0.002%. The upper limit of the Nb content is preferably less than 0.010%.

[Structure]

The structure of the seamless steel pipe of the present embodiment contains, in area ratio, 10 to 50% of ferrite and 0 to less than 5% of pearlite, and the balance is tempered bainite and/or tempered martensite.

Here, the area ratio of ferrite (ferrite ratio) and the area ratio of pearlite (pearlite ratio) are determined by the following method. One visual field of 160×120 μm observation region is selected from each of the external surface, the center in wall thickness and the internal surface of a cross-section perpendicular to the axial direction of the seamless steel pipe. Samples including the respective observation regions are collected. Surfaces including the respective observation regions of the samples (referred to as observation surfaces) are ground. The ground observation surfaces are etched using a nital etching reagent. Ferrite and pearlite are identified in the respective observation regions in the observation surfaces, using an optical microscope (with an observation field of 160×120 μm and an observation magnification of ×500). The area ratios (%) of the identified ferrite and the area ratios (%) of the identified pearlite are measured by the point counting method. The average of the measured area ratios of ferrite and the average of the measured area ratios of pearlite are defined as the ferrite ratio (%) and the pearlite ratio (%) of the seamless steel pipe, respectively.

In the structure of the seamless steel pipe of the present embodiment, the ferrite ratio is 50% or less and tempered bainite and/or tempered martensite are formed as phases other than ferrite. Thus, the occurrence of HIC attributable to yield of ferrite, which has low strength, can be suppressed. The above structure may contain no pearlite. In other words, the pearlite ratio may be 0%.

Furthermore, as described above, since the area ratio of pearlite, which easily causes cracking, is 0 to less than 5%, HIC is less liable to occur and excellent HIC resistance can be achieved. Furthermore, since the ferrite ratio is 10% or more, embrittlement of crystal grain boundaries is suppressed. Therefore, even if a microscopic crack is formed in the steel, propagation of the crack is suppressed and excellent HIC resistance can be achieved.

[Coarse Inclusion Count]

In the seamless steel pipe of the present embodiment, furthermore, from among the inclusions in the steel, the number of inclusions each having a diameter of 50 μm or more (coarse inclusions) is not more than 15 per 100 mm$^2$.

As described above, even where the area ratios of ferrite and pearlite, which serve as the starting point of occurrence of HIC, are suppressed, if many coarse inclusions remain in the steel, HIC (including blisters) may occur with the interface of coarse inclusions as the starting point. Therefore, the number of coarse inclusions is preferably as small as possible.

In the seamless steel pipe of the present embodiment, if the coarse inclusion count N is not more than 15 per 100 mm$^2$, HIC with coarse inclusions as the starting point is less liable to occur.

The diameter of the inclusion and the number of inclusions are measured by the following method. Samples are collected from an arbitrary cross-section parallel to the axial direction of the seamless steel pipe. The samples each include an observation region that includes the center in wall thickness of the seamless steel pipe and has the area of 100 mm$^2$. The surfaces including the observation regions (observation surfaces) are mirror-polished. The inclusions (sulfide inclusions (e.g., MnS), oxide inclusions (e.g., $Al_2O_3$) and carbo-nitride inclusions) in the observation region of the polished observation surface of each ground sample are identified using an optical microscope. More specifically, in the observation region, oxide inclusions, sulfide inclusions and carbo-nitride inclusions are identified based on the contrast and the shapes in the optical microscope.

The diameter of each of the identified inclusions (oxide inclusions, sulfide inclusions and carbo-nitride inclusions) are measured. In the present description, the diameter of the inclusion means the maximum one (m) from among straight lines each connecting two different points on an interface between an inclusion and the matorix. However, for a group of clustered inclusions, the diameter is determined with the group of clustered inclusions regarded as one inclusion. More specifically, for a group of three or more inclusions, as illustrated in FIG. 1, the center axis of each inclusions is specified. The shortest distance in the center axis direction between adjacent inclusions is defined as a distance d (μm). Furthermore, the distance between the center axes of adjacent inclusions is defined as a center-to-center distance s (μm). If the inclusions are present with the distances d of 40 μm or less and the center-to-center distances s of 10 μm or less, the group of these inclusions is regarded as one inclusion. The above-described method that the group of these inclusions is regarded as one inclusion is the same as JIS G0555(2003)5.2.3. An inclusion having a diameter of 50 μm or more is identified as a coarse inclusion.

In each observation region, the total number of coarse inclusions is counted. Then, the total number of coarse inclusions in all of the observation regions TN is obtained. Based on the obtained total number TN, the coarse inclusion count per 100 mm$^2$ N (per 100 mm$^2$) is obtained using Formula (A).

$$N = TN/\text{Total area of observation regions} \quad (A)$$

[Manufacturing Method]

There is now described one example of the method for manufacturing the seamless steel pipe for a line pipe used in sour environments according to the present embodiment.

A steel having the above-described chemical composition is melted and refined by a well-known method. Subsequently, the molten steel is cast into a continuous cast material (a slab, a bloom or a billet) by the continuous casting process.

[Continuous Casting Process]

In continuous casting, the cooling rate is preferably as high as possible. Also, it is preferable to control the casting temperature by, e.g., employing tundish heater in order to accelerate the floatation of large-size inclusions. Consequently, the coarse inclusion count N can be controlled to be not more than 15 per 100 m$^2$.

More specifically, the molten steel holding temperature inside the tundish is set at 1540° C. or more. In this case, in the tundish, coarse inclusions agglomerate and float, and are thereby removed from the steel. Also, the cooling rate for a temperature range of from 1500° C. to 1200° C. is set to no less than 50° C./minute to prevent the inclusions from coarsening and make the inclusions evenly and finely disperse.

[Pipe-Making Process]

If the continuous casting material is a slab or a bloom, the continuous casting material is hot-rolled to produce a billet. For example, the slab or the bloom is subjected to blooming to produce a billet.

Subsequently, a seamless steel pipe is produced using the billet by hot pipe making method. More specifically, the billet is heated in a heating furnace. The billet extracted from the heating furnace is hot-worked to produce a seamless steel pipe. More specifically, piercing-rolling based on the Mannesmann process is performed to produce a hollow shell. The produced hollow shell is further subjected to elongation rolling and sizing using a mandrel mill, a reducer, a sizing mill or the like to produce a seamless steel pipe.

The produced seamless steel pipe is subjected to quenching and tempering under the following conditions.

[Quenching]

In the present embodiment, the ferrite ratio and the pearlite ratio in the structure are reduced by quenching to produce bainite and/or martensite. The quenching temperature is not less than an $A_1$ point, and the cooling rate is not less than 5° C./sec.

If the quenching temperature is not less than the $A_1$ point, the structure of the steel at the quenching temperature consists of two phases, ferrite and austenite. For the seamless steel pipe of the present embodiment, it is sufficient that quenching is performed at the cooling rate from the temperature range that is the two-phase range. Even in this case, ferrite and pearlite, which are factors for occurrence of HIC, can effectively be suppressed.

If the hot-worked seamless steel pipe is directly quenched, the lower limit of the quenching temperature is an $A_{r1}$ point. On the other hand, if the hot-worked seamless steel pipe is temporarily cooled and then heated to a quenching temperature and quenched, or if the hot-worked seamless steel pipe is put in a holding furnace and heated to a quenching temperature, the lower limit of the quenching temperature is the $A_{c1}$ point.

The lower limit of the quenching temperature is preferably is an $A_3$ point. More specifically, if the hot-worked seamless steel pipe is directly quenched, the lower limit of the quenching temperature is preferably an Ara point. If the hot-worked seamless steel pipe is temporarily cooled and then heated to a quenching temperature and quenched or if the hot-worked seamless steel pipe is put in a holding furnace, heated to a quenching temperature and quenched, the lower limit of the quenching temperature is preferably an $A_{c3}$ point. In this case, since the structure of the steel at the quenching temperature is the austenitic phase alone, production of ferrite and pearlite can further be suppressed and the yield strength can be enhanced.

The upper limit of the quenching temperature is preferably 980° C., further preferably 950° C. In this case, significant deterioration in toughness due to coarsening of the grains can be suppressed. Thus, the toughness of the steel is enhanced.

[Tempering]

In the present embodiment, the tempering temperature for tempering is set to the $A_{c1}$ point or less. Furthermore, in order to suppress production of pearlite in tempering, a tempering parameter PL defined by Formula (1) below is set to less than 19500.

$$PL=(T+273)\times(21.3-5.8\times C+\log(t)) \quad (1)$$

In Formula (1), the tempering temperature (° C.) is assigned to T and the carbon content (%) of the seamless steel pipe is assigned to C. The holding period (soaking period; unit is hr) at the tempering temperature T (° C.) is assigned to t.

If the tempering parameter PL is 19500 or more, the bainite and the martensite in the steel partly become austenite. Thus, in cooling after the soaking, pearlite is produced from the austenite. As a result, the area ratio of pearlite in the steel becomes 5% or more.

If the tempering parameter PL is less than 19500, production of pearlite in tempering can be suppressed. Thus, in the structure of the seamless steel pipe of the present embodiment, the pearlite ratio can be set to less than 5%.

The seamless steel pipe of the present embodiment produced under the above-described manufacture conditions has excellent HIC resistance despite the low strength.

Example

Steels A to Z indicated in Table 1 were melted.

TABLE 1

| Steel | Chemical composition (unit: mass %, balance being Fe and impurities) | | | | | | | | | | | | $A_{c1}$ (° C.) | $A_{c3}$ (° C.) |
|---|---|---|---|---|---|---|---|---|---|---|---|---|---|---|
| | C | Si | Mn | P | S | Cr | sol. Al | O | N | Ca | Ti | Nb | | |
| A | 0.07 | 0.27 | 0.86 | 0.010 | 0.0030 | 0.09 | 0.033 | 0.0030 | 0.0040 | 0.0025 | — | — | 723 | 865 |
| B | 0.06 | 0.25 | 0.86 | 0.010 | 0.0022 | 0.09 | 0.038 | 0.0028 | 0.0045 | 0.0016 | 0.009 | — | 722 | 870 |
| C | 0.06 | 0.25 | 0.86 | 0.010 | 0.0024 | 0.09 | 0.037 | 0.0031 | 0.0047 | 0.0016 | 0.008 | 0.003 | 722 | 870 |
| D | 0.06 | 0.25 | 0.87 | 0.011 | 0.0020 | 0.09 | 0.038 | 0.0030 | 0.0050 | 0.0025 | — | — | 722 | 867 |
| E | 0.06 | 0.23 | 0.82 | 0.014 | 0.0047 | 0.08 | 0.025 | 0.0013 | 0.0035 | 0.0013 | 0.010 | — | 722 | 872 |
| F | 0.06 | 0.24 | 1.14 | 0.008 | 0.0044 | 0.09 | 0.036 | 0.0031 | 0.0041 | 0.0027 | 0.007 | — | 719 | 859 |
| G | 0.07 | 0.25 | 1.15 | 0.012 | 0.0038 | 0.08 | 0.032 | 0.0020 | 0.0051 | 0.0023 | 0.008 | — | 719 | 856 |
| H | 0.05 | 0.22 | 0.86 | 0.010 | 0.0032 | 0.08 | 0.035 | 0.0018 | 0.0047 | 0.0017 | 0.010 | — | 721 | 873 |
| I | 0.07 | 0.21 | 0.83 | 0.010 | 0.0034 | 0.08 | 0.047 | 0.0019 | 0.0046 | 0.0009 | 0.009 | — | 721 | 869 |
| J | 0.05 | 0.23 | 0.86 | 0.014 | 0.0036 | 0.08 | 0.035 | 0.0018 | 0.0049 | 0.0011 | 0.010 | — | 722 | 876 |
| K | 0.07 | 0.25 | 1.29 | 0.012 | 0.0017 | 0.05 | 0.037 | 0.0010 | 0.0042 | 0.0020 | 0.009 | — | 721 | 864 |
| L | 0.12 | 0.30 | 1.25 | 0.013 | 0.0038 | 0.10 | 0.038 | 0.0011 | 0.0033 | 0.0021 | 0.009 | 0.010 | 714 | 837 |
| M | 0.11 | 0.26 | 1.29 | 0.011 | 0.0009 | 0.11 | 0.046 | 0.0010 | 0.0039 | 0.0020 | 0.010 | — | 718 | 848 |
| N | 0.11 | 0.26 | 1.32 | 0.012 | 0.0010 | 0.11 | 0.046 | 0.0010 | 0.0030 | 0.0020 | 0.010 | — | 718 | 848 |
| O | 0.11 | 0.26 | 1.33 | 0.013 | 0.0010 | 0.11 | 0.043 | 0.0012 | 0.0051 | 0.0014 | 0.009 | — | 718 | 847 |
| P | 0.11 | 0.26 | 1.29 | 0.011 | 0.0013 | 0.11 | 0.027 | 0.0015 | 0.0045 | 0.0022 | 0.010 | — | 718 | 840 |
| Q | 0.12 | 0.21 | 1.28 | 0.008 | 0.0033 | 0.11 | 0.034 | 0.0012 | 0.0043 | 0.0014 | 0.009 | 0.010 | 711 | 828 |
| R | 0.12 | 0.21 | 1.28 | 0.008 | 0.0031 | 0.11 | 0.036 | 0.0012 | 0.0044 | 0.0014 | 0.010 | 0.010 | 711 | 828 |
| S | 0.20 | 0.19 | 1.12 | 0.014 | 0.0011 | 0.02 | 0.032 | 0.0013 | 0.0033 | 0.0016 | — | — | 717 | 816 |
| T | 0.19 | 0.23 | 0.98 | 0.017 | 0.0036 | 0.11 | 0.026 | 0.0015 | 0.0038 | 0.0010 | — | 0.008 | 720 | 823 |
| U | 0.19 | 0.19 | 1.05 | 0.014 | 0.0080 | 0.05 | 0.027 | 0.0018 | 0.0046 | 0.0011 | — | — | 718 | 829 |
| V | 0.19 | 0.24 | 0.95 | 0.014 | 0.0038 | 0.06 | 0.029 | 0.0022 | 0.0034 | 0.0016 | — | 0.008 | 720 | 824 |
| W | 0.19 | 0.27 | 0.97 | 0.012 | 0.0051 | 0.05 | 0.031 | 0.0016 | 0.0038 | 0.0013 | — | 0.009 | 721 | 826 |
| X | 0.18 | 0.25 | 0.94 | 0.011 | 0.0067 | 0.04 | 0.031 | 0.0031 | 0.0046 | 0.0026 | — | — | 721 | 826 |
| Y | 0.07 | 0.25 | 0.86 | 0.010 | 0.0028 | 0.09 | 0.036 | 0.0020 | 0.0036 | — | — | — | 722 | 862 |
| Z | 0.07 | 0.25 | 0.86 | 0.010 | 0.0031 | 0.09 | 0.038 | 0.0031 | 0.0045 | 0.0016 | 0.009 | — | 723 | 866 |

The symbol "–" in Table 1 indicates that the content is substantially "0"% (impurity level). Referring to Table 1, the chemical compositions of steels A to Z were all within the range of chemical composition of the seamless steel pipe of the present embodiment.

A plurality of billets, which are indicated in Table 2, were produced using the respective molten steels by the continuous casting process.

TABLE 2

| Number | Steel | Produced pipe size Outer diameter (mm) | Wall thickness (mm) | Casting Tundish temperature (°C) | Normalizing N temperature (°C) | Quenching Q temperature (°C) | Tempering T temperature (°C) | T period (min) | PL | YS (MPa) | Structure F ratio (%) | P ratio (%) | Balance | N (per 100 mm²) | CAR (%) | Number of Blisters (per 20 cm²) | Remarks |
|---|---|---|---|---|---|---|---|---|---|---|---|---|---|---|---|---|---|
| 1 | A | 323.9 | 20 | >1540 | — | 950 | 650 | 60 | 19285 | 321 | 25.9 | 0.0 | B, M | 7 | 0.0 | 0 | Inventive example |
| 2 | B | 323.9 | 20 | >1540 | — | 950 | 650 | 60 | 19339 | 316 | 27.8 | 0.0 | B, M | 6 | 0.0 | 0 | Inventive example |
| 3 | C | 323.9 | 20 | >1540 | — | 950 | 650 | 60 | 19339 | 338 | 25.0 | 0.0 | B, M | 7 | 0.0 | 0 | Inventive example |
| 4 | D | 323.9 | 20 | >1540 | — | 950 | 650 | 60 | 19339 | 344 | 10.8 | 0.0 | B, M | 7 | 0.0 | 0 | Inventive example |
| 5 | E | 323.9 | 17.5 | >1540 | — | 950 | 650 | 60 | 19339 | 305 | 13.2 | 0.0 | B, M | 2 | 0.0 | 0 | Inventive example |
| 6 | F | 406.4 | 21.4 | >1540 | — | 950 | 650 | 60 | 19339 | 355 | 17.0 | 0.0 | B, M | 9 | 0.0 | 0 | Inventive example |
| 7 | G | 406.4 | 21.4 | >1540 | — | 950 | 650 | 60 | 19285 | 366 | 24.7 | 0.0 | B, M | 6 | 0.0 | 0 | Inventive example |
| 8 | H | 323.9 | 12.7 | >1540 | — | 950 | 650 | 60 | 19285 | 325 | 17.9 | 0.0 | B, M | 2 | 0.0 | 0 | Inventive example |
| 9 | I | 406.4 | 12.7 | >1540 | — | 950 | 650 | 60 | 19392 | 328 | 16.7 | 0.0 | B, M | 2 | 0.0 | 0 | Inventive example |
| 10 | J | 323.9 | 12.7 | >1540 | — | 950 | 650 | 60 | 19392 | 310 | 28.7 | 0.0 | B, M | 3 | 0.0 | 0 | Inventive example |
| 11 | K | 219.1 | 12.7 | >1540 | — | — | — | — | — | 280 | 78.3 | 21.7 | — | 16 | 2.3 | >30 | Comparative example |
| 12 | L | 219.1 | 12.7 | >1540 | — | — | — | — | — | 418 | 77.9 | 22.1 | — | 5 | 1.5 | >30 | Comparative example |
| 13 | M | 273.1 | 12.7 | >1540 | — | — | — | — | — | 314 | 75.0 | 25.0 | — | 2 | 0.5 | >30 | Comparative example |
| 14 | N | 219.1 | 12.7 | >1540 | — | — | — | — | — | 307 | 71.7 | 28.3 | — | 2 | 0.8 | >30 | Comparative example |
| 15 | O | 323.9 | 12.7 | >1540 | — | — | — | — | — | 314 | 68.3 | 31.7 | — | 2 | 0.2 | >30 | Comparative example |
| 16 | P | 219.1 | 12.7 | >1540 | — | — | — | — | — | 299 | 65.0 | 35.0 | — | 2 | 0.4 | >30 | Comparative example |
| 17 | Q | 219.1 | 12.7 | >1540 | 920 | — | — | — | — | 340 | 73.3 | 26.7 | — | 9 | 1.8 | >30 | Comparative example |
| 18 | R | 219.1 | 12.7 | >1540 | 920 | — | — | — | — | 360 | 81.7 | 18.3 | — | 6 | 1.5 | 20 | Comparative example |
| 19 | S | 273.1 | 12.7 | >1540 | 920 | — | — | — | — | 340 | 73.3 | 26.7 | — | 4 | 1.5 | >30 | Comparative example |
| 20 | | 273.1 | 12.7 | >1540 | — | — | — | — | — | 333 | 68.3 | 31.7 | — | 4 | 3.2 | >30 | Comparative example |
| 21 | T | 219.1 | 12.7 | >1540 | — | — | — | — | — | 321 | 71.7 | 28.3 | — | 1 | 1.0 | >30 | Comparative example |
| 22 | U | 408.4 | 40.5 | >1540 | — | 950 | 650 | 60 | 18643 | 399 | 21.9 | 0.0 | B, M | 14 | 0.0 | 0 | Inventive example |
| 23 | | 408.4 | 40.5 | >1540 | — | 950 | 680 | 60 | 19249 | 386 | 19.4 | 0.0 | B, M | 14 | 0.0 | 0 | Inventive example |
| 24 | | 408.4 | 40.5 | >1540 | — | 950 | 695 | 90 | 19722 | 365 | 20.1 | 5.6 | B, M | 13 | 0.2 | 10 | Comparative example |
| 25 | | 408.4 | 40.5 | >1540 | — | 950 | 705 | 300 | 20437 | 333 | 22.3 | 9.3 | B, M | 12 | 0.2 | 12 | Comparative example |
| 26 | | 408.4 | 40.5 | >1540 | — | 950 | 710 | 300 | 20542 | 331 | 23.2 | 11.1 | B, M | 13 | 0.2 | 21 | Comparative example |
| 27 | | 408.4 | 40.5 | >1540 | 920 | — | — | — | — | 314 | 61.7 | 38.3 | — | 11 | 0.9 | >30 | Comparative example |
| 28 | | 408.4 | 40.5 | >1540 | — | — | — | — | — | 289 | 56.7 | 43.3 | — | 14 | 1.5 | >30 | Comparative example |
| 29 | V | 323.9 | 33.3 | >1540 | — | 950 | 650 | 60 | 18643 | 381 | 18.5 | 0.0 | B, M | 3 | 0.0 | 0 | Inventive example |
| 30 | | 323.9 | 33.3 | >1540 | — | 950 | 660 | 60 | 18845 | 370 | 18.6 | 0.0 | B, M | 3 | 0.0 | 0 | Inventive example |
| 31 | | 323.9 | 33.3 | >1540 | — | 950 | 695 | 90 | 19722 | 354 | 18.6 | 10.2 | B, M | 2 | 0.2 | >30 | Comparative example |
| 32 | | 323.9 | 33.3 | >1540 | — | 950 | 705 | 300 | 20437 | 334 | 19.1 | 14.8 | B, M | 3 | 1.1 | >30 | Comparative example |
| 33 | | 323.9 | 33.3 | >1540 | — | 950 | 710 | 300 | 20542 | 325 | 19.7 | 16.7 | B, M | 3 | 1.5 | >30 | Comparative example |
| 34 | | 323.9 | 33.3 | >1540 | — | — | — | — | — | 280 | 71.7 | 28.3 | — | 3 | 2.2 | >30 | Comparative example |
| 35 | X | 323.9 | 33.3 | >1540 | 920 | — | — | — | — | 313 | 65.0 | 35.0 | — | 19 | 0.5 | >30 | Comparative example |
| 36 | | 323.9 | 33.3 | >1540 | — | — | — | — | — | 292 | 55.0 | 45.0 | — | 23 | 2.2 | >30 | Comparative example |
| 37 | W | 355.6 | 27.79 | >1540 | — | — | — | — | — | 296 | 56.7 | 43.3 | — | 9 | 1.1 | >30 | Comparative example |
| 38 | Y | 406.4 | 12.7 | >1540 | — | 850 | 670 | 30 | 19419 | 290 | 48.1 | 3.7 | B, M | 2 | 0.0 | 0 | Inventive example |
| 39 | | 406.4 | 12.7 | >1540 | — | 950 | 670 | 30 | 19419 | 310 | 16.7 | 1.9 | B, M | 5 | 0.0 | 0 | Inventive example |
| 40 | Z | 323.9 | 20 | <1540 | — | 950 | 650 | 60 | 19285 | 330 | 26.8 | 0.0 | — | 17 | 0.0 | 6 | Comparative example |

The temperature of each molten steel in the tundish in continuous casting is indicated in Table 2 (see the "Tundish temperature" column). In the continuous casting, the cooling rate in the temperature range in which the steel temperature is 1500° C. to 1200° C. was not less than 50° C./minute for all of the numbers. A seamless steel pipe was produced using each produced billet. More specifically, the billet was heated to 1100° C. and then a hollow shell was produced using a piercing mill. Subsequently, the produced hollow shell was subjected to elongation rolling using a mandrel mill and then to sizing using a reducer to produce a seamless steel pipe of each of numbers 1 to 40, which has the outer diameter and the wall thickness indicated in Table 2.

As necessary, the produced seamless steel pipe of each number was subjected to the heat treatments indicated in Table 2 (normalizing, quenching and tempering). The indication of a temperature (° C.) in the field in the "normalizing" column corresponding to a number in Table 2 means that normalizing of the seamless steel pipe of that number was performed at the normalizing temperature indicated in "N temperature" in Table 2. The indication of numerical values in the "Quenching" column and the "Tempering" column in Table 2 mean that the seamless steel pipe of the relevant number was subjected to quenching at the quenching temperature (° C.) indicated in the "Q temperature" in the "Quenching" column and also to tempering at the tempering temperature (° C.) indicated in the "T temperature" in the "Tempering" column with the seamless steel pipe held for the soaking period (min) indicated in the "T period" in the Tempering column. The cooling rate where quenching was performed was not less than 5° C./sec for each number. The "PL" column indicates the tempering parameters PL for the respective numbers. Where quenching was performed, the cooling rate in the quenching was not less than 5° C./sec for each number.

Indication of "–" in any of the "Normalizing" column, the "Quenching" column and the "Tempering" column means that the relevant heat treatment was not performed. Indication of "–" in all of the "Normalizing" column, the "Quenching" column and the "Tempering" column means that the seamless steel pipe of the relevant number was cooled to normal temperature without being subjected to heat treatments after pipe making (that is, an as-rolled member).

The following tests were conducted for the seamless steel pipes produced under the above-described conditions.

[Structure Observation Test]

The structure (ferrite, pearlite, bainite and/or martensite) of the seamless steel pipe of each number was identified by the above-described test method using an optical microscope. Furthermore, the ferrite ratio (%) and the pearlite ratio (%) were obtained by the point counting method.

[Coarse Inclusion Count Measuring Test]

The coarse inclusion count N of the seamless steel pipe of each number was obtained by the above-described measuring method.

[Yield Strength Test]

From each of the seamless steel pipes of the respective numbers, a round-bar tensile test specimen having a parallel part measuring 6.35 mm in outer diameter and 25.4 mm in length was sampled. The parallel part was parallel to the axial direction of the seamless steel pipe. Using each of the sampled round-bar tensile test specimens, a tension test was conducted at normal temperature (25° C.) to obtain the yield strength YS (0.5% total strain) (MPa).

[CAR Evaluation Test]

From each of the seamless steel pipes of the respective numbers, a test specimen (with a thickness of 12 to 30 mm, a width of 20 mm and a length of 100 mm) was sampled from all of positions in wall thickness except those that 1 mm or less from the outermost surface and are 1 mm or less from the innermost surface. Each test specimen had a pair of surfaces corresponding to the outer and inner surfaces of the relevant seamless steel pipe.

Using each of the sampled test specimens, an HIC test conforming to NACE TM0284-2011 defined by NACE (National Association of Corrosion Engineers) International was conducted. An acetic acid aqueous solution of 25° C. that has an initial pH of 2.7, contains 5 wt % of NaCl+0.5 wt % of $CH_3COOH$ and is charged with a gas with an $H_2S$ partial pressure of 1 bar was prepared as a test solution. The test specimen was immersed in the prepared test solution for 96 hours.

The area of HIC occurred in each test specimen after the test was measured by the ultrasonic testing method and the crack area ratio CAR (%) was obtained according to Formula (B). the area of the test specimen in Formula (B) was 20×100 mm. As reference measurement conditions, it was determined that there is HIC if the reflection echo of 20% or more was obtained using a sound pressure that provides 80% or more of B1 echo in A scope.

$$\text{Crack area ratio CAR=area of HIC occurred in test specimen/area of test specimen} \quad (B)$$

Furthermore, the number of blisters (per 20 $cm^2$) occurred in each test specimen after the test was counted by the following method. Surfaces of the test specimen after the test (two surfaces of 20 mm wide×100 mm long corresponding to the inner surface and the outer surface of the seamless steel pipe) was observed visually. Then, the total number of blisters occurred in the surfaces was counted to determine the number of blisters (per 20 $cm^2$).

[Test Results]

Referring to Table 2, in numbers 1 to 10, 22, 23, 29, 30, 38 and 39, the chemical composition was proper, and quenching and tempering were performed. Furthermore, the tundish temperature in the casting, the quenching temperature and the tempering temperature were also proper, and the tempering parameter PL was proper as well. Thus, the yield strength was less than 400 MPa, and the ferrite ratio and the pearlite ratio in the structure were proper. Furthermore, the coarse inclusion count N was not more than 15 per 100 $mm^2$. As a result, for each of the numbers, the crack area ratio CAR was 0% and the number of blisters was 0 per 20 $cm^2$. Accordingly, for these numbers, excellent HIC resistance was achieved.

In number 38, the quenching temperature was in the two-phase range; however, the ferrite ratio and the pearlite ratio in the structure were proper. Thus, the crack area ratio CAR was 0% and the number of blisters was 0 per 20 $cm^2$.

On the other hand, in test numbers 11 to 16, 20, 21, 28, 34, 36 and 37, the chemical composition was proper; however quenching and tempering were not performed and the pipe was allowed to cool to normal temperature directly after pipe making. Thus, the pearlite ratio in the structure was 5% or more. Thus, the crack area ratio CAR in each of the test numbers was 0.2% or more, which is high, and occurrence of HIC was confirmed. Furthermore, the number of blisters was not less than 5 per 20 $cm^2$.

In numbers 11 and 36, the tundish temperature was less than 1540° C., which is too low. Thus, the coarse inclusion count N was more than 15 per 100 $mm^2$.

In test numbers 17 to 19, 27 and 35, the chemical composition was proper; however, quenching and tempering were not performed, and normalizing was performed after pipe making. Thus, the pearlite ratio in the structure was 5% or more. Thus, the crack area ratio CAR was 0.2% or more, which is high, in each of the numbers. Furthermore, the number of blisters was not less than 5 per 20 $cm^2$.

In number 35, the tundish temperature was less than 1540° C., which is too low. Thus, the coarse inclusion count N was more than 15 per 100 mm$^2$.

In test numbers 24 to 26 and 31 to 33, the chemical composition was proper, and quenching and tempering were performed; however, the tempering parameter PL was 19500 or more. Thus, although the structure contained ferrite, bainite and/or martensite, the pearlite ratio was 5% or more. As a result, the crack area ratio was 0.2% or more, and the number of blisters was not less than 5 per 20 cm$^2$.

In test number 40, the chemical composition was proper, quenching and tempering were performed, and the tempering parameter PL was less than 19500; however, the tundish temperature was less than 1540° C., which is too low. Therefore, the coarse inclusion count N was more than 15 per 100 mm$^2$. Thus, although the crack area ratio CAR was 0%, the number of blisters was not less than 5 per 20 cm$^2$, and the HIC resistance was low.

The embodiment of the present invention has been described above. However, the above-described embodiment is a mere illustration for carrying out the present invention. Therefore, the present invention is not limited to the embodiment, and the present invention can be carried out with the embodiment arbitrarily modified without departing from the spirit of the invention.

The invention claimed is:

1. A seamless steel pipe for a line pipe used in sour environments, comprising:
a chemical composition consisting, in mass %, of,
C: 0.01 to 0.20%,
Si: 0.05 to 0.50%,
Mn: 0.3 to 2.0%,
P: 0.02% or less,
S: 0.01% or less,
Cr: 0.02 to 0.2%,
sol. A: 0.001 to 0.100%,
O: 0.0050% or less,
N: 0.0100% or less,
Ca: 0 to 0.0050%,
Ti: 0 to 0.012%, and
Nb: 0 to 0.012%,
the balance being Fe and impurities; and
a structure consisting, in area ratio, of 10 to 50% of ferrite and 0 to less than 5% of pearlite, the balance being tempered bainite and/or tempered martensite,
wherein the number of inclusions each having a diameter of 50 μm or more is not more than 15 per 100 mm$^2$; and
wherein the seamless steel pipe has a yield strength of 400 MPa or less.

2. The seamless steel pipe for a line pipe according to claim 1, wherein
Ca content is in the range of 0.0005 to 0.0050%.

3. The seamless steel pipe for a line pipe according to claim 1, wherein
Ti content is in the range of 0.002 to 0.012%, and/or
Nb content is in the range of 0.002 to 0.012%.

4. The seamless steel pipe for a line pipe according to claim 2, wherein
Ti content is in the range of 0.002 to 0.012%, and/or
Nb content is in the range of 0.002 to 0.012%.

* * * * *